United States Patent
Crisan et al.

(10) Patent No.: US 8,755,390 B2
(45) Date of Patent: *Jun. 17, 2014

(54) NETWORK DATA CONGESTION MANAGEMENT METHOD

(71) Applicants: Daniel Crisan, Zürich (CH); Casimer M. DeCusatis, Poughkeepsie, NY (US); Mitch Gusat, Langnau (CH); Cyriel J. A. Minkenberg, Gutenswil (CH)

(72) Inventors: Daniel Crisan, Zürich (CH); Casimer M. DeCusatis, Poughkeepsie, NY (US); Mitch Gusat, Langnau (CH); Cyriel J. A. Minkenberg, Gutenswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/624,869

(22) Filed: Sep. 21, 2012

(65) Prior Publication Data

US 2013/0021910 A1    Jan. 24, 2013

Related U.S. Application Data

(63) Continuation of application No. 12/765,735, filed on Apr. 22, 2010.

(51) Int. Cl.
 *H04L 12/28* (2006.01)
 *H04L 12/56* (2006.01)
 *G06F 15/173* (2006.01)

(52) U.S. Cl.
 USPC ............... 370/395.31; 370/395.53; 370/409; 709/238

(58) Field of Classification Search
 USPC .................. 370/395.2–395.4, 400–409, 389; 709/238–242
 See application file for complete search history.

(56) References Cited

U.S. PATENT DOCUMENTS

| | | | |
|---|---|---|---|
| 5,740,346 A | 4/1998 | Wicki et al. | 395/182.02 |
| 6,075,769 A | 6/2000 | Ghanwani et al. | 370/232 |
| 7,403,496 B2 | 7/2008 | Bonta | 370/310 |
| 7,414,977 B2 | 8/2008 | Orlik et al. | 370/238 |
| 2005/0220096 A1* | 10/2005 | Friskney et al. | 370/389 |
| 2006/0176810 A1 | 8/2006 | Kekki | 370/229 |
| 2008/0037558 A1 | 2/2008 | Kawakami | 370/395.53 |
| 2011/0032843 A1* | 2/2011 | Papp et al. | 370/254 |
| 2011/0044173 A1* | 2/2011 | Kakadia et al. | 370/238 |
| 2011/0255410 A1 | 10/2011 | Yamen et al. | 370/237 |

OTHER PUBLICATIONS

Thodime et al., Dynamic Congestion-Based Load Balanced Routing in Optical Burst-Switched Networks, GLOBECOM 2003, pp. 2628-2632 (2003).
A. Farrel, "A Path Computation Element (PCE)-Based Architecture", https://www3.tools.ietf.org/html/rfc4655, pp. 1-41 (2006).
T. Kawakami et al., "Network Working Group Internet Draft", http://tools.ietf.org/html/draft-kawakami-mpls-lsp-vlan-00, p. 1-15 (2003).
International Search Report and Written Opinion for PCT/EP2011/056367, p. 1-14 (Jun. 8, 2011).

* cited by examiner

*Primary Examiner* — Habte Mered
(74) *Attorney, Agent, or Firm* — Steven Chiu

(57) ABSTRACT

A method to manage data congestion in a computer network may include network devices to route data packets throughout the network. The method may also include a source node that sends data packets to any of the network devices. The method may further include a routing table at each network device that is updated by the source node, and the route the data packets are sent by any network device is based upon each respective routing table.

7 Claims, 9 Drawing Sheets

NETWORK DATA CONGESTION MANAGEMENT METHOD

CROSS REFERENCE TO RELATED APPLICATIONS

This is a Continuation Application under 35 U.S.C. §120 to U.S. patent application Ser. No. 12/765,735 entitled "Network Data Congestion Management Method", filed Apr. 22, 2010, which application is incorporated herein by reference.

BACKGROUND OF THE INVENTION

1. Field of the Invention

The invention relates to the field of computer systems, and, more particularly, to address data congestion and management of such.

2. Description of Background

Generally, conventional Ethernet fabrics are dynamically routed. In other words, packets are directed from one switch node to the next, hop by hop, through the network. Examples of protocols used include Converged Enhanced Ethernet (CEE), Fibre Channel over Converged Enhanced Ethernet (FCoCEE), and Data Center Bridging (DCB), as well as proprietary routing schemes.

SUMMARY OF THE INVENTION

According to one embodiment of the invention, a method to manage network congestion. The method may include sending data packets to any of network devices from a source node. The method may also include routing the data packets throughout a network via the network devices. The method may further include updating a routing table at each network device by the source node, and the routing table determines the route the data packets are sent by any network device.

The method may also include adding a header to the data packets by the source node, and the header defines a virtual local area network. The method may further include providing a destination node address used by the source node to determine the route the data packets follow.

The method may also include collecting congestion notification messages from the network devices via the source node to map the collected congestion notification messages to a network topology. The method may further include filtering the congestion notification messages used by the source node. The method may additionally include routing around any network device for which the collected congestion notification messages reveal a history of congestion.

The method may also include routing to or around any network device based upon a link cost indicator. The method may further include selecting the order of the routes based on packet's destination node address.

DETAILED DESCRIPTION OF THE INVENTION

The invention will now be described more fully hereinafter with reference to the accompanying drawings, in which preferred embodiments of the invention are shown. Like numbers refer to like elements throughout, like numbers with letter suffixes are used to identify similar parts in a single embodiment, and letter suffix lower case n is a variable that indicates an unlimited number of similar elements.

Figure 1:
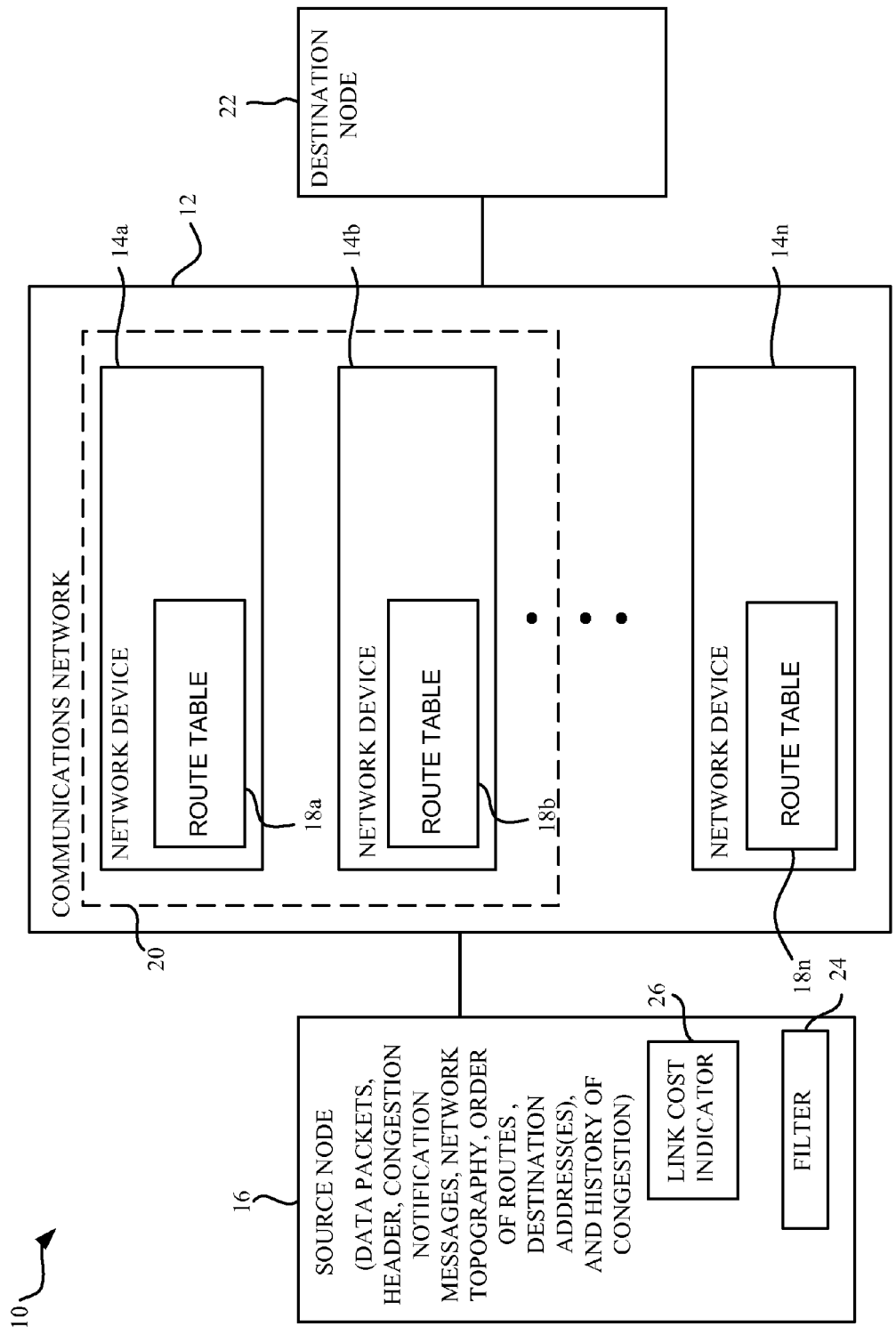
FIG. 1 is a schematic block diagram of a system to address network data congestion management in accordance with the invention.

With reference now to FIG. 1, a system 10 to address data congestion management in a computer network 12 is initially described. The system 10 is a programmable apparatus that stores and manipulates data according to an instruction set as will be appreciated by those of skill in the art.

In one embodiment, the system 10 includes a communications network 12, which enables a signal, e.g. data packet and/or the like, to travel anywhere within, or outside of, system 10. The communications network 12 is wired and/or wireless, for example. The communications network 12 is local and/or global with respect to system 10, for instance.

In one embodiment, the system 10 includes network devices 14*a*-14*n* to route data packets throughout the network 12. The network devices 14*a*-14*n* are computer network equipment such as switches, network bridges, routers, and/or the like. The network devices 14*a*-14*n* can be connected together in any configuration to form communications network 12 as will be appreciated by those of skill in the art.

In one embodiment, the system 10 includes a source node 16 that sends data packets to any of the network devices 14*a*-14*n*. There can be any number of source nodes 16 in system 10. The source node 16 is any piece of computer equipment that is able to send data packets to the network devices 14*a*-14*n*.

In one embodiment, the system 10 further includes a routing table 18*a*-18*n* at each respective network device 14*a*-14*n* that is updated by the source node 16. The route the data packets are sent by any network device 14*a*-14*n* is based upon each respective routing table 18*a*-18*n*.

In one embodiment, the network devices 14*a*-14*n* are members of at least one virtual local area network 20. The virtual local area network 20 permits the network devices 14*a*-14*n* to be configured and/or reconfigured with less regard for each network devices' 14*a*-14*n* physical characteristics as such relates to the communications network's 12 topology as will be appreciated by those of skill in the art. In another embodiment, the source node 16 adds a header to the data packets in order to define the virtual local area network 20.

The system 10 may additionally include the use of a destination node address to determine the route the data packets follow through network 12. The destination node address relates to a destination node 22 and there can be any number of destination nodes 22 in system 10. In one embodiment, only the source node 16 is ever active in selecting the routes, and the destination node 22 is useful as an address only (not active as a node), i.e. the destination node is used by the source node in selecting routes. In another embodiment, the destination node 22 is an active node that works with the source node 16 to select the routes.

In one embodiment, the source node 16 collects congestion notification messages from the network devices 14a-14n, and maps the collected congestion notification messages to the network topology. The system 10 may additionally include a filter 24 that controls which portions of the congestion notification messages from the network devices 14a-14n are used by the source node 16. Furthermore, the source node 16 may route data packets around any network device 14a-14n for which the collected congestion notification messages reveal a history of congestion.

In one embodiment, the source node 16 routes to, or around, any network device 14a-14n based upon a link cost indicator 26. As discussed further below, congestion notification messages (CNMs) may be used as link cost indicators. In another embodiment, the system 10 further includes a destination node address used by the source node 16 to select the order of the routes.

Figure 2:
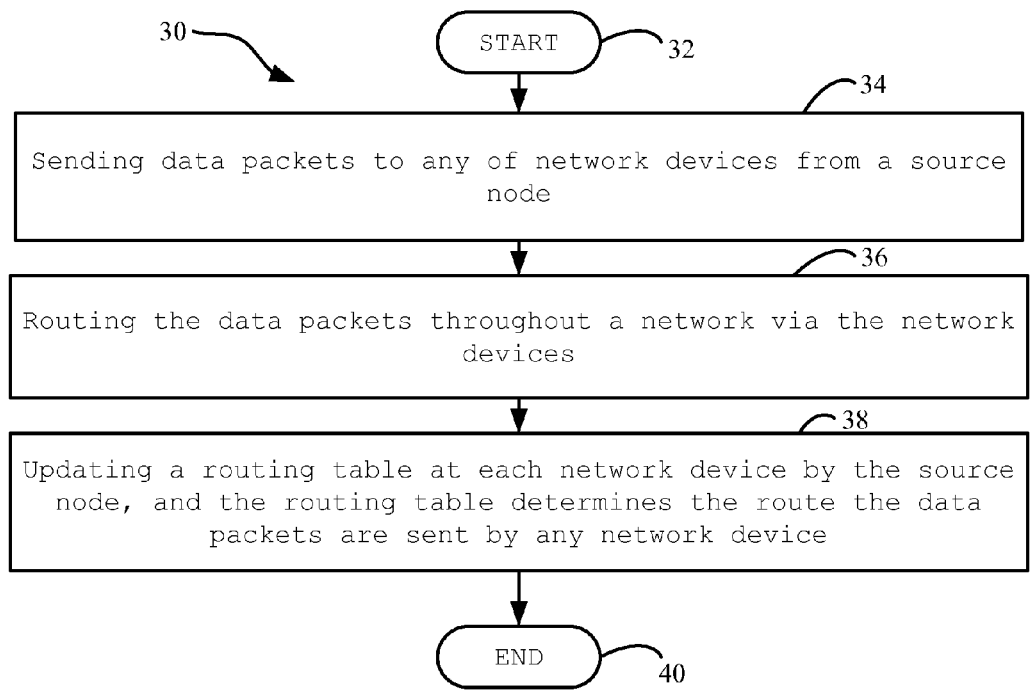
FIG. 2 is a flowchart illustrating method aspects according to the invention.

Another aspect of the invention is a method to manage network congestion on a computer network 12, which is now described with reference to flowchart 30 of FIG. 2. The method begins at Block 32 and may include sending data packets to any of network devices from a source node at Block 34. The method may also include routing the data packets throughout a network via the network devices at Block 36. The method may further include updating a routing table at each network device by the source node, and the routing table determines the route the data packets are sent by any network device at Block 38. The method ends at Block 40.

Figure 3:
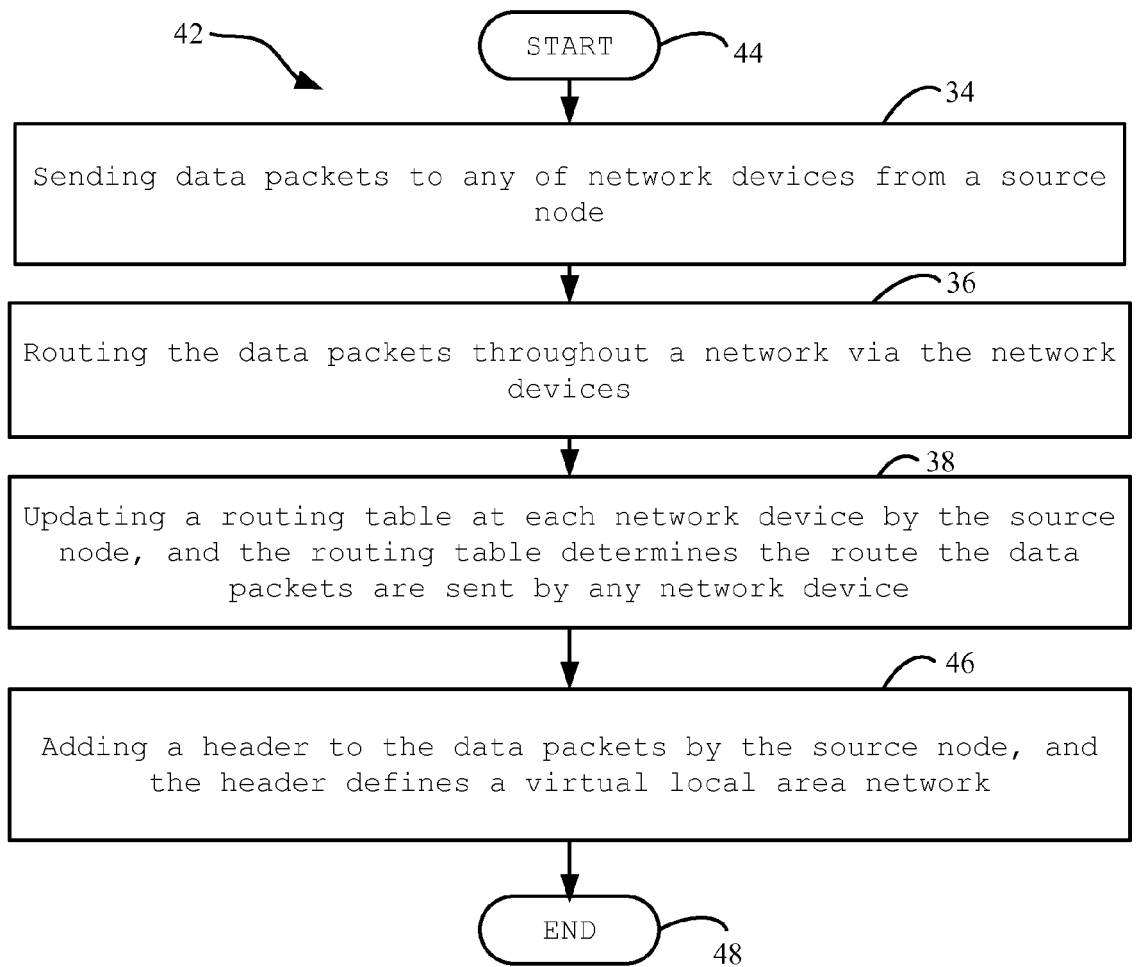
FIG. 3 is a flowchart illustrating method aspects according to the method of FIG. 2.

In another method embodiment, which is now described with reference to flowchart 42 of FIG. 3, the method begins at Block 44. The method may include the steps of FIG. 2 at Blocks 34, 36, and 38. The method may additionally include adding a header to the data packets by the source node, and the header defines a virtual local area network at Block 46. The method ends at Block 48.

Figure 4:
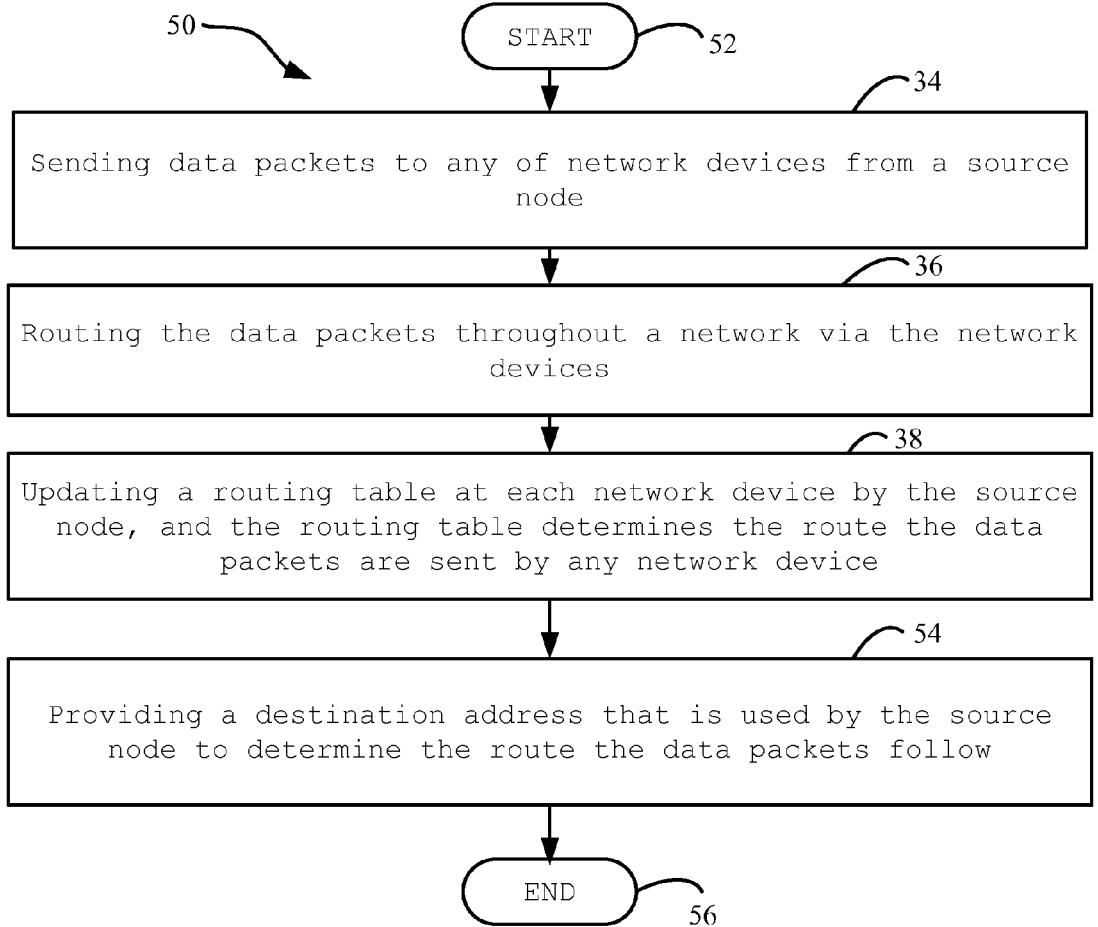
FIG. 4 is a flowchart illustrating method aspects according to the method of FIG. 2.

In another method embodiment, which is now described with reference to flowchart 50 of FIG. 4, the method begins at Block 52. The method may include the steps of FIG. 2 at Blocks 34, 36, and 38. The method may additionally include providing a destination node address that is used by the source node 16 to determine the route the data packets follow at Block 54. The method ends at Block 56.

Figure 5:
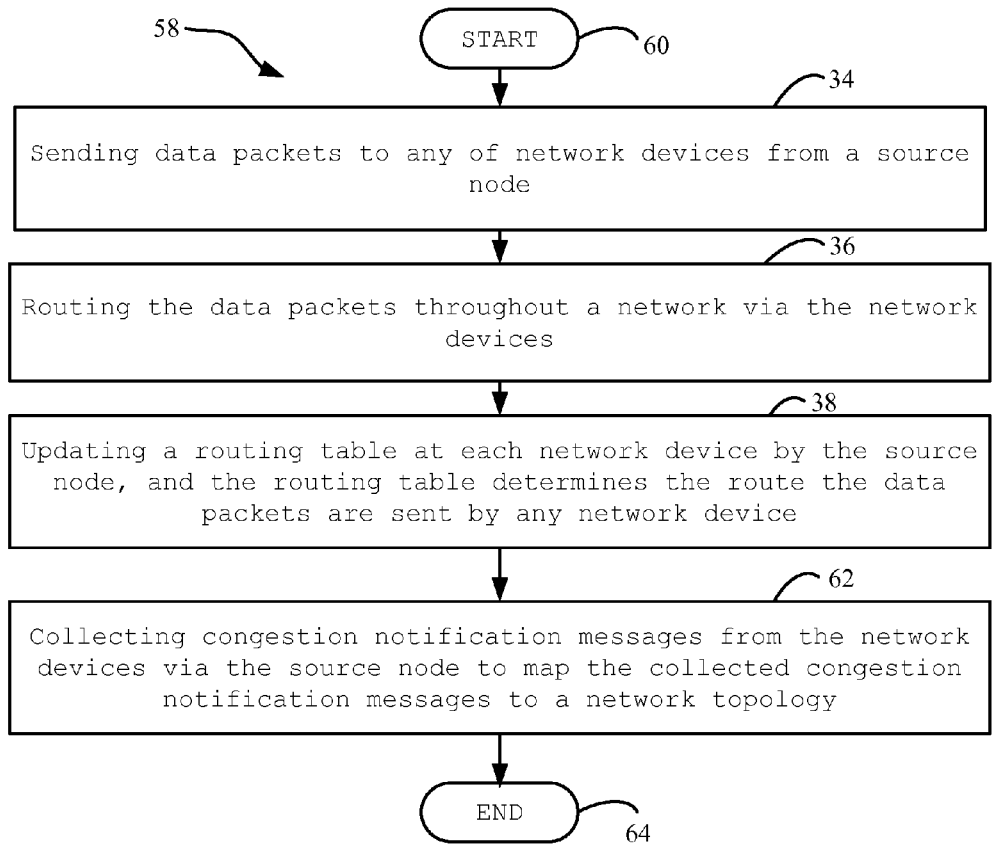
FIG. 5 is a flowchart illustrating method aspects according to the method of FIG. 2.

In another method embodiment, which is now described with reference to flowchart 58 of FIG. 5, the method begins at Block 60. The method may include the steps of FIG. 2 at Blocks 34, 36, and 38. The method may additionally include collecting congestion notification messages from the network devices via the source node to map the collected congestion notification messages to a network topology at Block 62. The method ends at Block 64.

Figure 6:
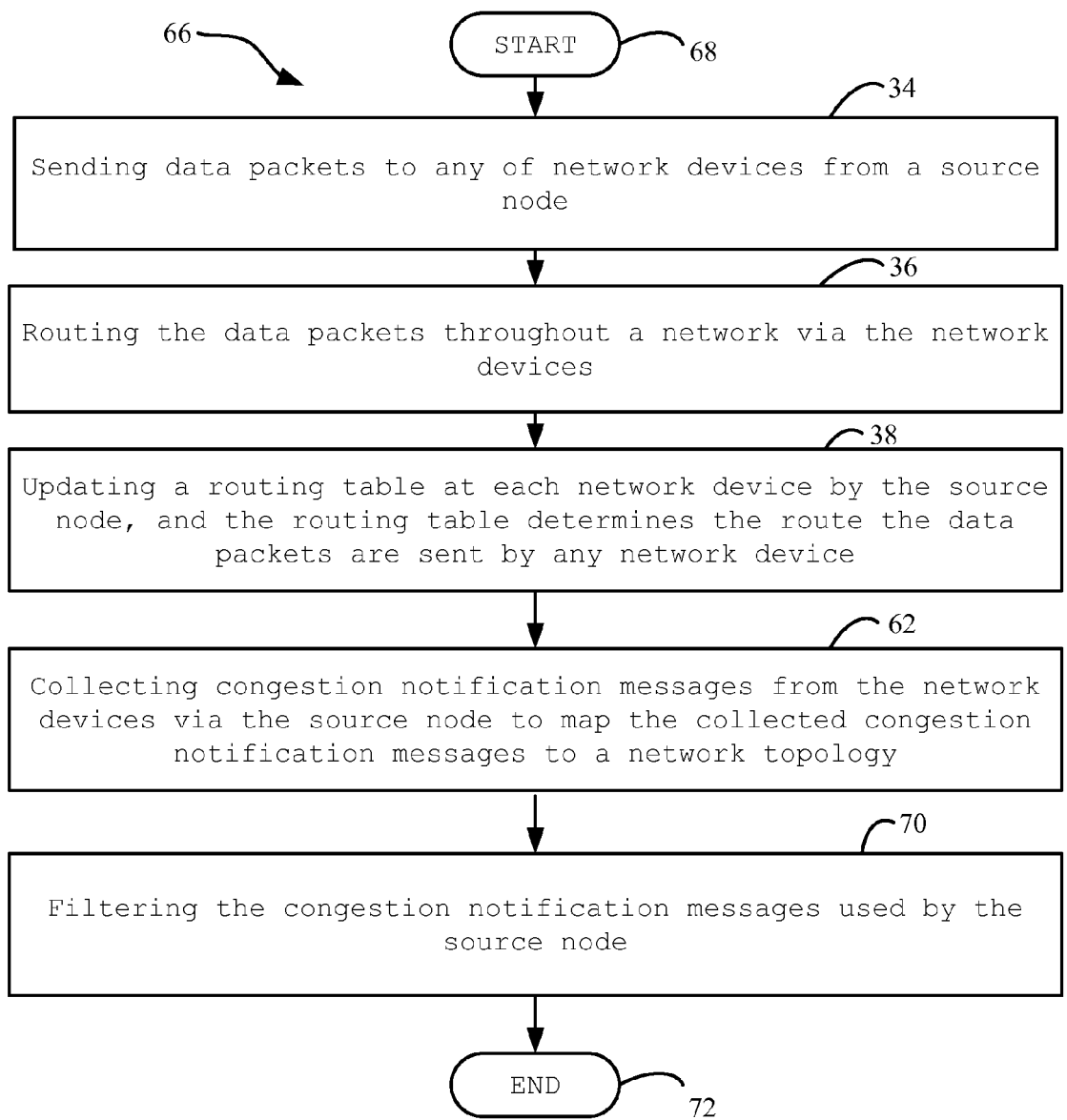
FIG. 6 is a flowchart illustrating method aspects according to the method of FIG. 5.

In another method embodiment, which is now described with reference to flowchart 66 of FIG. 6, the method begins at Block 68. The method may include the steps of FIG. 5 at Blocks 34, 36, 38, and 62. The method may additionally include filtering the congestion notification messages used by the source node at Block 70. The method ends at Block 72.

Figure 7:
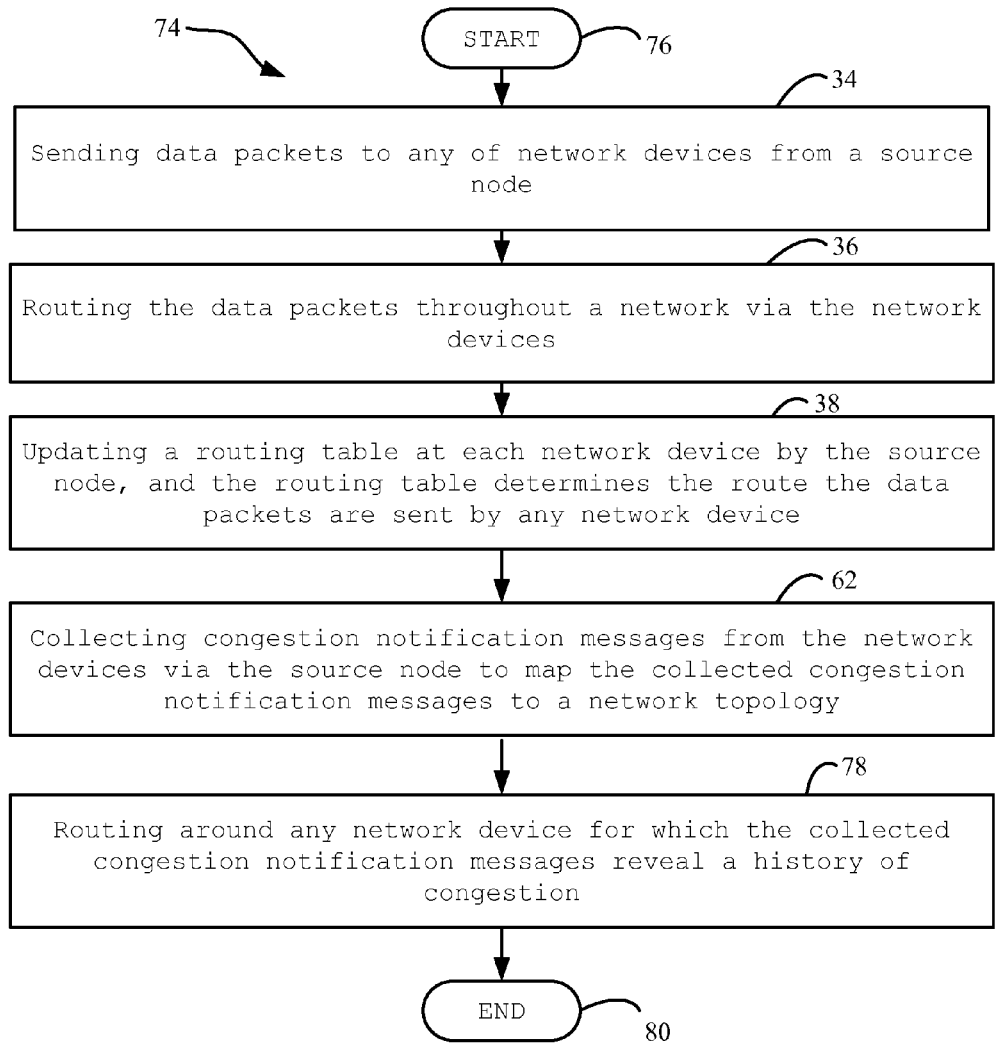
FIG. 7 is a flowchart illustrating method aspects according to the method of FIG. 5.

In another method embodiment, which is now described with reference to flowchart 74 of FIG. 7, the method begins at Block 76. The method may include the steps of FIG. 5 at Blocks 34, 36, 38, and 62. The method may additionally include routing around any network device for which the collected congestion notification messages reveal a history of congestion at Block 78. The method ends at Block 80.

Figure 8:
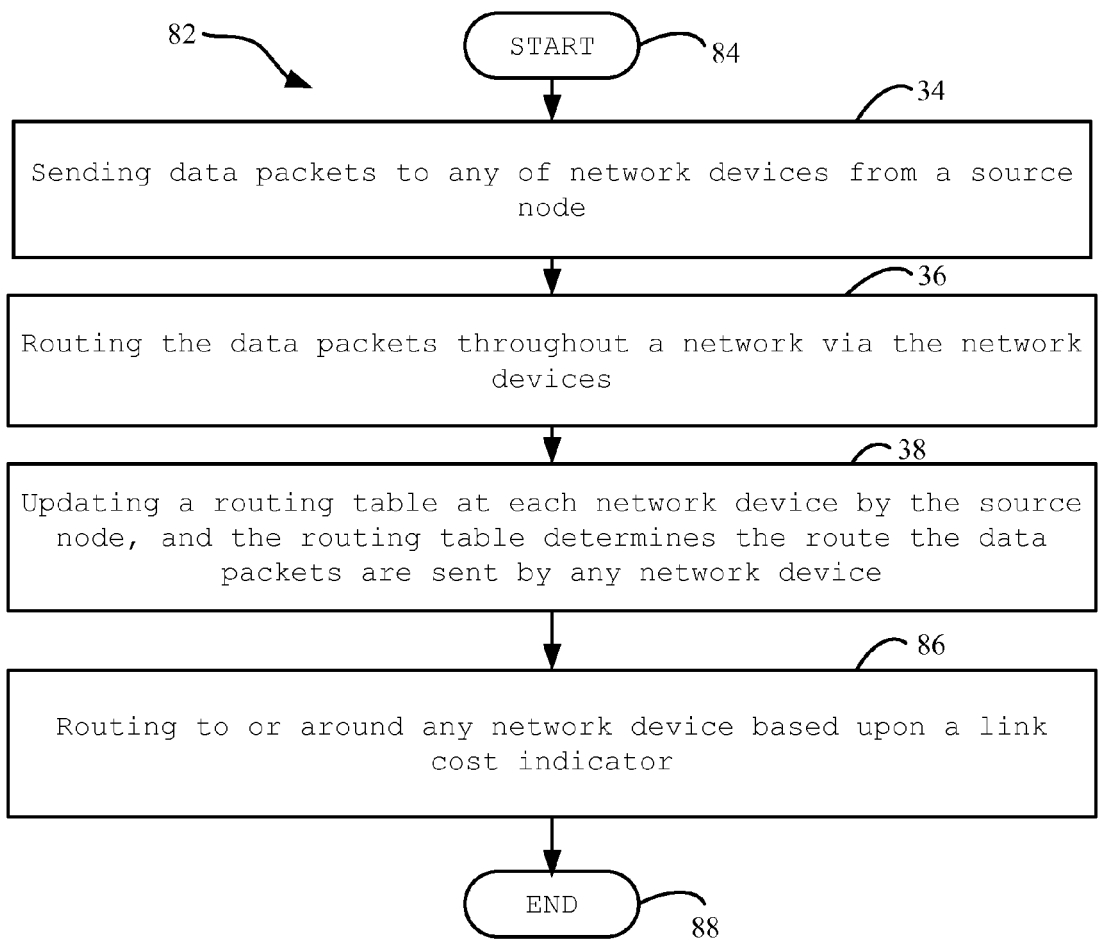
FIG. 8 is a flowchart illustrating method aspects according to the method of FIG. 2.

In another method embodiment, which is now described with reference to flowchart 82 of FIG. 8, the method begins at Block 84. The method may include the steps of FIG. 2 at Blocks 34, 36, and 38. The method may additionally include routing to or around any network device based upon a link cost indicator at Block 86. The method ends at Block 88.

Figure 9:
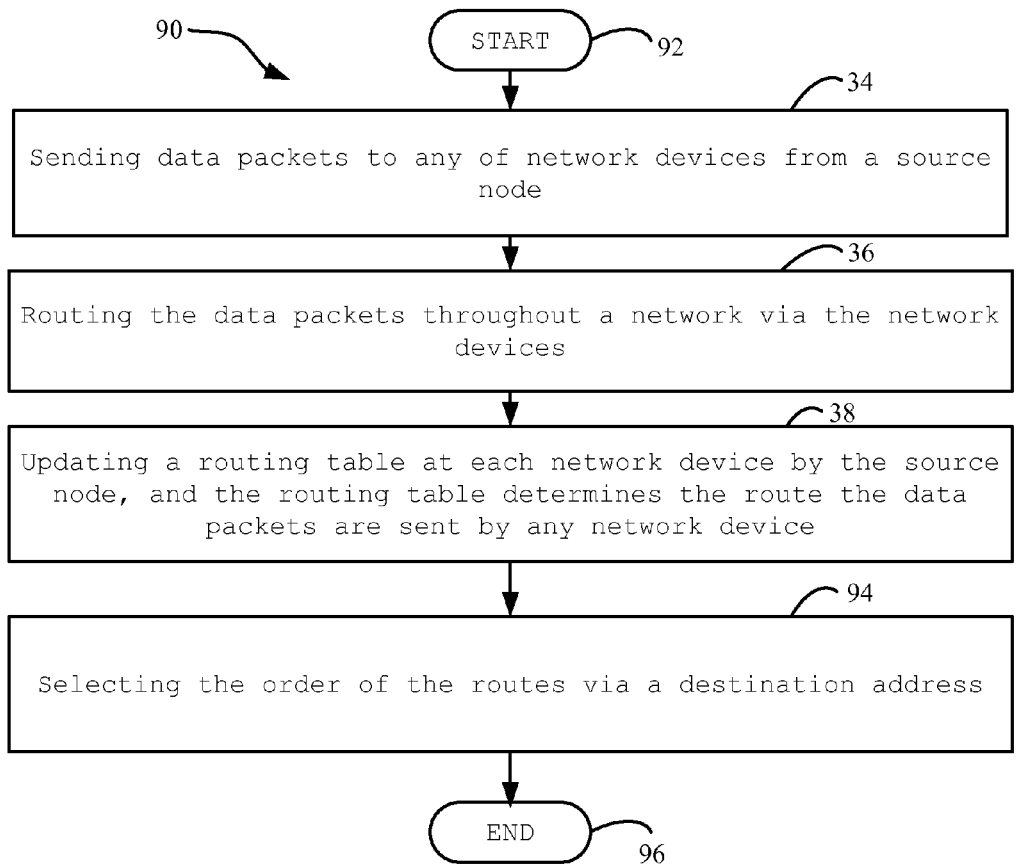
FIG. 9 is a flowchart illustrating method aspects according to the method of FIG. 2.

In another method embodiment, which is now described with reference to flowchart 90 of FIG. 9, the method begins at Block 92. The method may include the steps of FIG. 2 at Blocks 34, 36, and 38. The method may additionally include selecting the order of the routes via (by the means of) a destination node address at Block 94. The method ends at Block 96.

In view of the foregoing, the system 10 addresses data congestion management in a computer network 12. For instance, large converged networks do not define adequate means to control network congestion, leading to traffic delays, dropped data frames, and poor performance. The conventional hop-by-hop routing is not efficient at dealing with network congestion, especially when a combination of storage and networking traffic is placed over a common network, resulting in new and poorly characterized traffic statistics. If the benefits of converged networking are to be realized, a new method of traffic routing is required. To address such, system 10 uses a source based, reactive, and adaptive routing scheme.

In one embodiment, system 10 adds a virtual LAN (VLAN) 20 routing table 18a-18n in every network device 14a-14n, e.g. switches. The VLAN 20 is defined by a 12 bit header field appended to all packets (hence this is a source-based routing scheme), plus a set of routing table 18a-18n entries (in all the switches) that can route the VLANs.

The 12 bit VLAN 20 ID is in addition to the usual packet header fields, and it triggers the new VLAN 20 routing scheme in each network device 14a-14n. Each network device 14a-14n has its own routing entry for every active VLAN 20.

In one embodiment, the source node 16 (possibly also using the destination node address) use a global selection function to decide the optimal end-to-end path for the traffic flows. The optimal end-to-end path is then pre-loaded into the network devices 14a-14n, e.g. switches, that are members of this VLAN 20.

In one embodiment, the VLAN 20 table 18a-18n is adaptive and will be periodically updated. The refresh time of the routing table 18a-18n can be varied, but will probably be at least a few seconds for a reasonably large number (4,000 or so) of VLANs 20. The data traffic subject to optimization will use the VLANs 20 as configured by the controlling sources/applications 16.

In one embodiment, congestion notification messages (CNMs) from the network devices 14a-14n, e.g. fabric switches, are collected by the traffic source 16, marking the switch and port locations based on the port ID. Every traffic source 16 builds a history of CNMs that it has received, which is mapped to the network topology. Based on the source's 16 historical mapping of global end-to-end paths, the source will reconfigure any overloaded paths, defined by the VLAN 20 tables 18a-18n, to route around the most persistent congestion points (signaled by the enabled switches). In one embodiment, the CNMs are generated by the QCN standard and/or the like, or from other sources. In another embodiment, the Source node 16 adaptively changes the routing tables 18a-18n based on the feedback provided by the QCN congestion points and the knowledge of alternative paths in the network 12.

In one embodiment, for each destination, the source 16 knows all the possible paths a packet can take. The source 16 can then evaluate the congestion level along each of these paths and choose the one with the smallest cost, and therefore the method is adaptive.

In another embodiment, the order in which the paths are selected is given by the destination address. In the case that no CNMs are received, the source 16 will default to the same path used by conventional and oblivious methods.

In one embodiment, if the default path is congested, the alternative paths are checked next (by comparing their congestion cost), starting with the default one, in a circular search, until a non-congested path is found. Otherwise, the first path with the minimum congestion cost is chosen.

In another embodiment, the CNMs are used as link cost indicators 26. System 10 defines both a global and local method of cost weighting, plus a filtering scheme to enhance performance.

In this manner, system 10 can determine where the most congested links are located in the network 12. For each destination 22, the source 16 knows all the possible paths a packet can take. The source 16 can then evaluate the congestion level along each of these paths and choose the one with the smallest cost and therefore the method is adaptive.

In one embodiment, the system 10 uses at least one of two different methods of computing the path cost. The first is a global price, which is the (weighted) sum of the congestions levels on each link of the path. The other is the local price, which is the maximum (weighted) congestion level of a link of the path.

The intuition behind the local price method is that a path where a single link experiences heavy congestion is worse than a path where multiple links experience mild congestion. On the other hand, a path with two heavily congested links is worse than a path with a single heavily congested link.

The intuition behind using a global price method is that the CNMs received from distant network devices 14a-14n, e.g. switches, are more informative than those received from switches that are close to the source 16. This happens because the congestion appears on the links that are likely to concentrate more flows (i.e. the links that are farther away from the source).

In one embodiment, to avoid high frequency noise which could lead to instabilities in the network devices 14a-14n, e.g. switch, updating process, the system 10 applies filter 24 to the incoming stream of CNMs. The filter 24 is a low pass filter, for example. The filter 24 would have a running time window to average and smooth the CNM stream.

In one embodiment, periodically the source 16 will refresh, and if necessary, update the VLAN 20 path information in the affected network devices 14a-14n. In another embodiment, the optimal path routing is calculated by the source 16 and refreshed periodically throughout the switch fabric.

The system 10 can be implemented in hardware, software, and/or firmware.

Another aspect of the invention is a computer readable program codes coupled to tangible media to implement network congestion management. The computer readable program codes may be configured to cause the program to send data packets to any of network devices 14a-14n from a source node 16. The computer readable program codes may also route the data packets throughout a network 12 via the network devices 14a-14n. The computer readable program codes may additionally update a routing table 18a-18n at each network device 14a-14n by the source node 16, and the routing table determines the route the data packets are sent by any network device.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
   sending data packets to any of network devices from a source node;
   routing the data packets throughout a network via the network devices;
   collecting congestion notification messages in a congestion notification message stream from the network devices;
   updating a routing table at each network device by the source node, wherein the routing table determines the route the data packets are sent by any network device;
   adding a header to the data packets by the source node, the header defines a virtual local area network and includes virtual local area network identifier, the virtual local area network identifier triggers a new virtual local area network routing scheme in each network device; and
   filtering the congestion notification messages used by the source node from the network devices such that high frequency noise is blocked and the congestion notification message stream is smoothed.

2. The method of claim 1, further comprising providing a destination address that is used by the source node to determine the route the data packets follow.

3. The method of claim 1, further comprising mapping the collected congestion notification messages to a network topology.

4. The method of claim 3, further comprising updating the routing tables based upon the congestion notification messages.

5. The method of claim 3, further comprising routing around any network device for which the collected congestion notification messages reveal a history of congestion.

6. The method of claim 1, further comprising routing to or around any network device based upon a link cost indicator.

7. The method of claim 1, further comprising selecting the order of the routes via a destination address.

* * * * *